(12) United States Patent
Deffler (10) Patent No.: US 7,962,457 B2
(45) Date of Patent: Jun. 14, 2011

(54) SYSTEM AND METHOD FOR CONFLICT RESOLUTION

(75) Inventor: Tad Alan Deffler, Boonton, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 446 days.

(21) Appl. No.: 12/029,989

(22) Filed: Feb. 12, 2008

(65) Prior Publication Data

US 2009/0204643 A1 Aug. 13, 2009

(51) Int. Cl.
*G06F 7/00* (2006.01)
(52) U.S. Cl. ........................................ 707/703; 707/754
(58) Field of Classification Search .................. 707/511, 707/8, 703, 754
See application file for complete search history.

(56) References Cited

U.S. PATENT DOCUMENTS

| | | | |
|---|---|---|---|
| 5,838,915 A * | 11/1998 | Klausmeier et al. | 709/215 |
| 6,385,610 B1 | 5/2002 | Deffler et al. | 707/6 |
| 6,425,032 B1 * | 7/2002 | Prasanna | 710/117 |
| 6,751,617 B1 * | 6/2004 | Anfindsen | 1/1 |
| 6,859,919 B1 | 2/2005 | Deffler et al. | 717/100 |
| 2001/0013044 A1 * | 8/2001 | Mori et al. | 707/511 |
| 2006/0091199 A1 * | 5/2006 | Loughran | 235/376 |
| 2009/0112921 A1 * | 4/2009 | Oliveira et al. | 707/103 R |
| 2009/0204944 A1 * | 8/2009 | Williams et al. | 717/121 |

* cited by examiner

*Primary Examiner* — Shahid A Alam
*Assistant Examiner* — Donald Lawson
(74) *Attorney, Agent, or Firm* — Baker Botts L.L.P.

(57) ABSTRACT

A method for conflict resolution includes converting a first plurality of transactions into a first plurality of derivative objects in a first derivative model wherein each of the first plurality of derivative objects comprises a corresponding first type indicator and converting a second plurality of transactions into a second plurality of derivative objects in a second derivative model wherein each of the second plurality of derivative objects comprises a corresponding second type indicator. The first plurality of derivative objects is compared with the second plurality of derivative objects, and it is determined whether one or more conflicts exist between one or more of the first plurality of derivative objects and one or more of the second plurality of derivative objects.

20 Claims, 3 Drawing Sheets

SYSTEM AND METHOD FOR CONFLICT RESOLUTION

TECHNICAL FIELD

The present disclosure relates generally to data modeling and more particularly to a system and method for conflict resolution.

BACKGROUND

As the amount of digitally stored information has increased over the years, so too have the systems and methods for managing such information. It is not uncommon for individuals, and to a larger extent, corporations to amass hundreds, thousands, or even millions of documents, songs, spreadsheets, or other files that need to be organized and managed. Oftentimes such information is stored in a database or other similar storage application which can be accessed and modified by one or more users. During the course of managing such a storage application, two or more users may concurrently perform one or more independent and conflicting actions on the same file. In mature databases containing thousands or even millions of files, detecting and resolving such actions may be a long and cumbersome process. Consequently, the speed at which conflicting user actions may be detected and resolved is one metric that may be used to gauge the effectiveness of certain data management tools.

SUMMARY

In one embodiment, a method for conflict resolution includes receiving a first transaction log including a first plurality of transactions performed by a first user on one or more objects in an original data model and receiving a second transaction log including a second plurality of transactions performed by a second user on the one or more objects in the original data model. The first plurality of transactions is converted into a first plurality of derivative objects in a first derivative model wherein each of the first plurality of derivative objects comprises a corresponding first type indicator and the second plurality of transactions is converted into a second plurality of derivative objects in a second derivative model wherein each of the second plurality of derivative objects comprises a corresponding second type indicator. The first plurality of derivative objects is compared with the second plurality of derivative objects; and it is determined whether one or more conflicts exist between one or more of the first plurality of derivative objects and one or more of the second plurality of derivative objects.

Technical advantages of certain embodiments of the present disclosure may include the ability to efficiently detect and resolve conflicting actions performed by multiple users on a single data model. Additionally, certain embodiments of the present disclosure may reduce the amount of content that needs to be compared in order to detect conflicting user actions as well as provide user-friendly reports of such conflicts defined in readily understandable terms. Other objects, features, and advantages of the present disclosure will be apparent to persons of ordinary skill in the art in view of the following detailed description and the accompanying drawings.

DESCRIPTION OF EXAMPLE EMBODIMENTS

Figure 1:
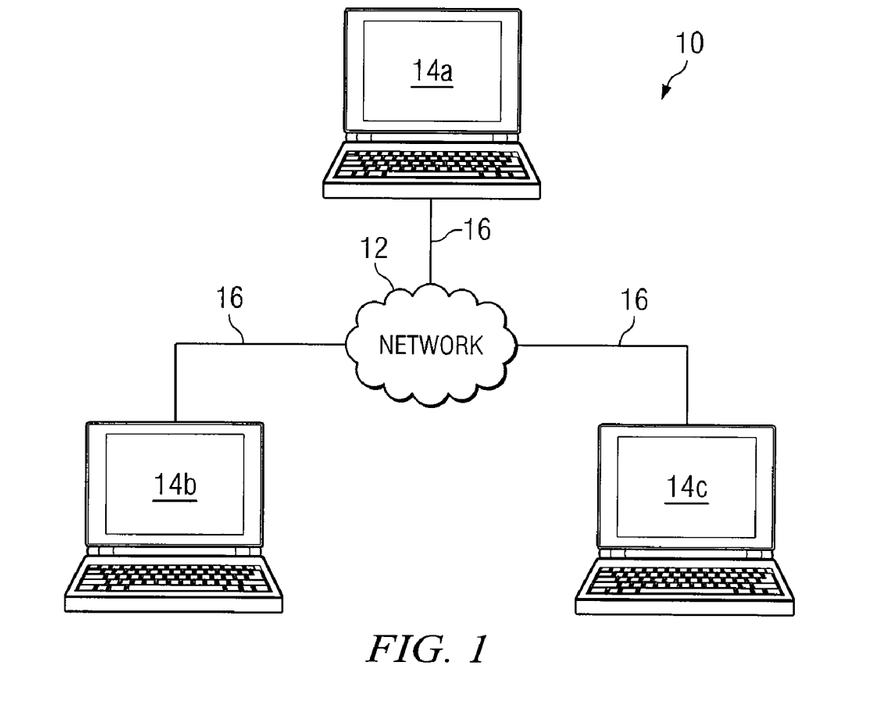
FIG. 1 illustrates an example system for performing conflict resolution and analysis according to the present disclosure.

FIG. 1 illustrates an example system 10 for performing conflict resolution and analysis. System 10 includes a number of network components coupled to and contained within a network 12. In particular embodiments, network 12 may include one or more local area networks (LAN), one or more wireless LANs (WLAN), one or more wide area networks (WAN), one or more metropolitan area networks (MAN), a portion of the Internet, or another form of network or a combination of two or more such networks. The present disclosure contemplates any suitable network 12 or combination of networks 12. In particular embodiments, components of network 12 are distributed across multiple cities or geographical regions. In particular embodiments, network 12 may be represented by multiple distinct, but interconnected networks that share components or distinctly contain similar components. Distinction between networks may be defined, for example, by geographic location, individual ownership, differing network architectures, or other distinction.

Example components of system 10 include one or more clients 14 coupled to network 12 via one or more links 16. In particular embodiments, links 16 may each include one or more wireline, wireless, or optical links. In particular embodiments, one or more links 16 each include a LAN, a WLAN, a WAN, a MAN, a portion of the Internet, or another link 16 or a combination of two or more such links 16. Each of the components coupled to network 12 communicate with each other via use of network 12.

Each of clients 14 may include any component of hardware or software or combination of two or more such components needed to provide data management services. As an example and not by way of limitation one or more clients 14 may be a personal computer, a server, a personal digital assistant (PDA), or another computing device including one or more processors and a memory comprising or capable of receiving program instructions recorded on tangible computer readable media that when executed by the processors perform the some or all of the functionality described herein. As an example and not by way of limitation, all of the functionality and features herein may reside and be performed on a single client 14, or may reside and be performed in a distributed fashion amongst multiple clients 14.

In particular embodiments one or more clients 14 may serve as a central repository for various data and computer resources such as applications, databases, and other electronically stored information that may be accessed and modified by one or more other clients 14. As an example and not by way of limitation, client 14a may include a data model 100 (e.g., a database management program) for managing stored information. In particular embodiments, copies of data model 100 may be checked out and modified by clients 14b and/or 14c. Once a particular copy of data model 100 has been check out and modified, it may be checked back in, and the changes reconciled with the original version of data model 100.

In particular embodiments two or more copies of data model 100 may be concurrently checked out and independently modified by two users. When two or more copies of data model 100 are concurrently checked out and independently modified, they may be compared with one another using one or more of the processes and components described herein to detect and resolve any conflicting changes before being reconciled with the original version of data model 100. One of ordinary skill in the art will appreciate that the above-described topology of system 10 has been presented for the sake of explanatory simplicity and will further appreciate that the present disclosure contemplates any suitable number of components being interconnected in any suitable topology in system 10 to perform the functionality described herein.

Figure 2:
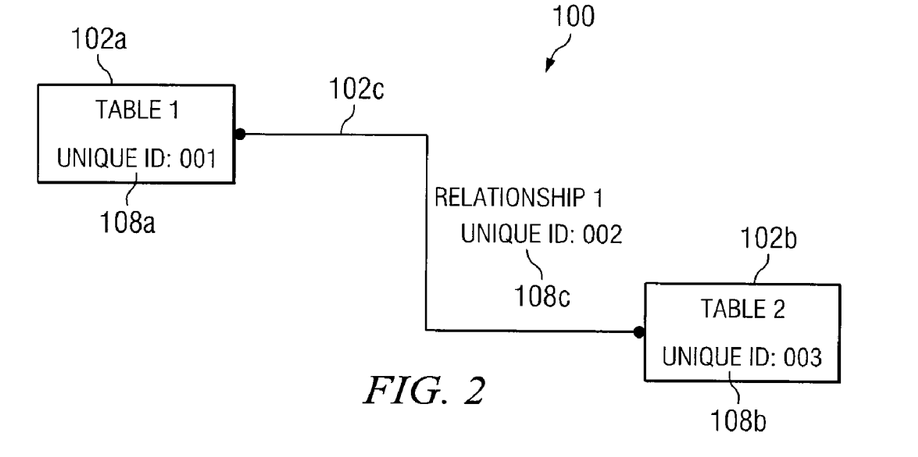
FIG. 2 illustrates an example data model according to the present disclosure.

FIG. 2 illustrates a graphical representation illustrated in IDEF1X notation of an example data model 100 for managing stored information. As an example and not by way of limitation, data model 100 may be a document management program, a database management program, or other data management program which manages any suitable collection of objects 102. In particular embodiments, each object 102 may be any unit of information or combination of two or more such units defined and described as a discrete entity by data model 100. For example, each object 102 could be a database, a table, a column within a table, an icon, a document, or a relationship between such objects. One of ordinary skill in the art will appreciate that the above-described embodiments of data model 100 and objects 102, were presented for the sake of explanatory simplicity and will further appreciate that the present disclosure contemplates the inclusion of any suitable type, number, and combination of objects 102 in data model 100 for any suitable management purpose.

Each object 102 may be associated with one or more object properties. An object property defines one or more characteristics of an object (e.g., the title of the object, the date the object was created, the type of the object, the location of the object within data model 100, or other descriptive information regarding the object). For example, each object 102 includes a title property (e.g., object 102 is entitled "Table 1," object 102*b* is entitled "Table 2," and object 102*c* is entitled "Relationship 1"), and each object 102 is associated with an inalterable unique ID 108 that may be used to particularly identify each object 102 regardless of what object properties have been modified. Unique ID 108 may be, for example, any number or other alphanumeric character capable from distinguishing one object from another.

In particular embodiments, data model 100 may be governed by a set of model specific rules. Model specific rules may be defined as a set of rules that govern the permitted activities within data model 100. The model specific rules for data model 100 may be determined by any number of criteria (e.g., the type of objects being managed, the intended use of data model 100, or the preferences of a user of data model 100). As an example and not by way of limitation, data model 100 may include a rule defining the maximum number of objects 102 that are allowed to simultaneously coexist in data model 100. As another example and not by way of limitation, data model 100 may include a rule stating that one type of object 200 cannot exist without another type of object 200 (e.g., a column cannot exist without a table). One of ordinary skill in the art will appreciate that the above-described object properties and modeling rules were presented for the sake of explanatory simplicity and will further appreciate that the present disclosure contemplates the inclusion of any suitable object properties or modeling rules in data model 100.

In particular situations, a user may wish to modify objects 102 in data model 100. In order to modify data model 102, the user may check out a copy of data model 100 from a central repository and may make several modifications thereto. In particular embodiments, each of the user's modifications may be recorded as a transaction in a transaction log 200 (discussed below). After modifying his copy of data model 100, the user may check in his copy of data model 100 to reconcile the changes with the original version of data model 100 (e.g., the original data model).

Figure 3:
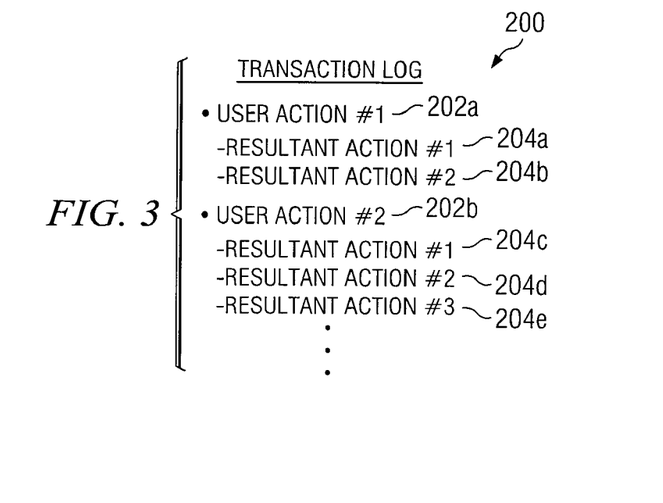
FIG. 3 illustrates an example transaction log according to the present disclosure.

FIG. 3 illustrates an example transaction log 200. Transaction log 200 may be any list, description, or other recording which describes the transactions carried out by a particular user on a copy of data model 100. As an example and not by way of limitation, transaction log 200 may be a spreadsheet, a document, a binary file or any other suitable record describing a user's transactions on data model 100 and may be automatically created by a program on a user's computer while the user is modifying his copy of data model 100.

In particular embodiments, there are three types of actions which may be recorded as a transaction in transaction log 200. These actions include, creating an object 200, modifying an object 200, or deleting an object 200 in data model 100. Moreover, each transaction in transaction log 200 may further include the unique ID 108 of the object 200 which it affects. As an example and not by way of limitation, when an object 200 is created in data model 100, the corresponding transaction in transaction log 200 may include the unique ID 108 identifying the newly created object 200 as well as a listing of the particular object properties associated with the newly created object 200. As an additional example and not by way of limitation, when an object 200 is modified in data model 100, the corresponding transaction in transaction log 200 may include the unique ID 108 of the modified object 200 as well as a description of the modification(s) (e.g., the original object properties and the modified object properties). As yet another example and not by way of limitation, when an object 200 is deleted from data model 100, the corresponding transaction in transaction log 200 may include the unique ID 108 of the deleted object 200 as well as an indication that the object has been deleted. Consequently, by studying nothing more than the transaction actions recorded in transaction log 200, it is possible to determine each and every one of the alterations made to data model 100 by a particular user.

In particular embodiments, the transactions in transaction log 200 may be separated into two categories: user actions 202 and resultant actions 204. A user action 202 is defined as any action directly performed by a user on his copy of data model 100. A resultant action 204 is defined as any action that is automatically performed (e.g. by the user's computer) as a result of a user action 202 (e.g., an action that is automatically performed as a consequence of a modeling rule of data model 100). As an example and not by way of limitation, data model 100 may include a rule that states that if two tables contained in data model 100 are linked by a relationship, the deletion of one table will automatically result in the deletion of the relationship. Consequently, if a user deletes object 102*b* (the user action), data model 100 will automatically delete object 102*c* (the resultant action). In particular embodiments, resultant actions 204 may also be performed as a consequence of other resultant actions 204. Depending upon the complexity and nature of data model 100, a particular user action 202 may result in multiple resultant actions 204.

In particular embodiments, each resultant action 204 may be linked to the particular user action 202 from which it stems. As an example and not by way of limitation, resultant action 204*a* and 204*b* may each include an indicator which associates them with user action 202*a*. Consequently, resultant actions 204*a* and 204*b* may be identified to a user with reference to user action 202*a*. This feature may be particularly useful if data model 100 contains numerous interrelated objects 102 because each user action 202 may result in a large number of resultant actions 204.

In particular situations, one or more of the transactions in transaction log 200 may be overwritten or otherwise nullified by a subsequent transaction in transaction log 200. As an example and not by way of limitation, if object 102a is modified by a first transaction in transaction log 200 and is later deleted by a second transaction in transaction log 200, the net result is that object 102a was deleted from data model 100 regardless of whether object 102a was modified. As an additional example and not by way of limitation, if a particular object 102 is created by a first transaction in transaction log 200 and is later deleted by a second transaction in transaction log 200, the net result is that the object never existed at all. Consequently, for purposes of reconciling a user's copy of data model 100 with the original version of data model 100, one or more of the transactions recorded in transaction log 200 may be "netted."

Netting involves calculating the net effect of a series of ordered transactions in transaction log 200 and disregarding or eliminating those transactions which are inconsequential to the net effect upon data model 100. Once a series of transactions has been netted, only those transactions which are essential to the net result will remain. The concept of netting applies equally well in the context of both user actions 202 and resultant actions 204. By netting the transactions in transaction log 200, the size and complexity of transaction log 200 may be substantially reduced.

As mentioned above, by referring to transaction log 200, it is possible to determine each and every modification made to data model 100 by a particular user. Since transaction log 200 contains a complete record of a particular user's alterations to data model 100, transaction log 200 may be used as a basis for comparing the alterations of one user to data model 100 with those of another user. As an example and not by way of limitation, it may be the case that two users concurrently check out a copy of data model 100, each user making independent changes to their respective copies of data model 100. Assuming that a transaction log similar to transaction log 200 has been created for each user, the first user's transaction log may be compared with the second user's transaction log to determine whether any conflicting transactions have occurred.

To compare two transaction logs against one another, each transaction log may be converted into an object oriented model (hereafter, a "derivative model") containing objects that have been derived from the transactions in each transaction log(hereafter, "derivative objects"). More particularly, each transaction in a particular transaction log may be converted into a representative derivative object which is then included in a corresponding derivative model. After a derivative model has been created for each transaction log, the derivative models may then be compared with one another using the techniques of the present disclosure.

Figure 4:
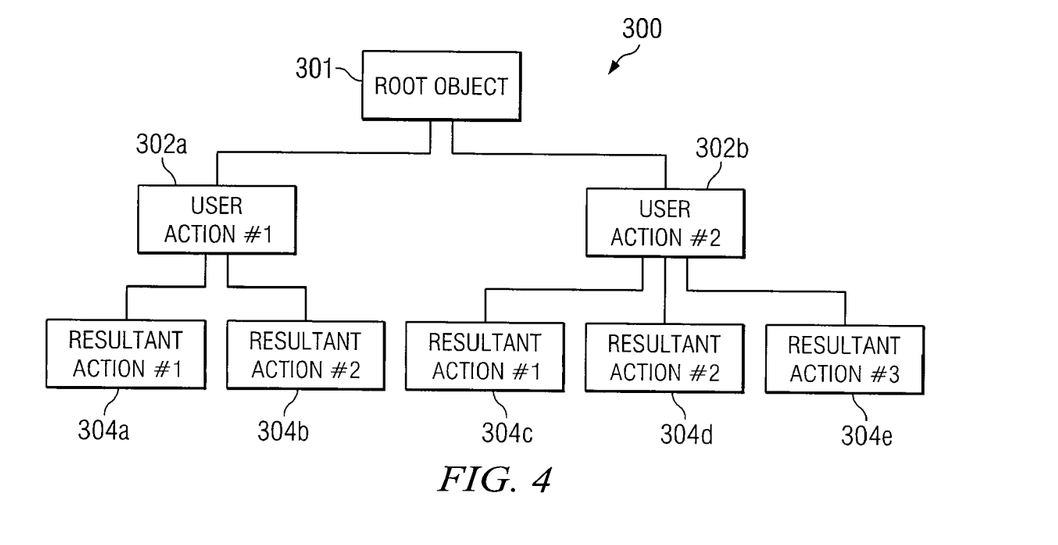
FIG. 4 illustrates an example derivative model derived from the transaction log of FIG. 3.

FIG. 4 illustrates an example derivative model 300 that has been derived from transaction log 200 of FIG. 3. More particularly, derivative model 300 includes a root object 301, below which, a plurality of user action objects 302 and resultant action objects 304 are hierarchically arranged. In particular embodiments, each user action object 302 represents a user action 202 and each resultant action object 304 represents a resultant action 204 in transaction log 200. In particular embodiments, root object 301 is created for organizational purposes to serve as a top level node in the hierarchy of derivative model 300 beneath which all derivative objects in derivative model 300 may be arranged.

In particular embodiments, each derivative object in derivative model 300 may be either a user action object 302 or a resultant action object 304. Additionally, each derivative object may include an object property (e.g., a type indicator) that indicates the type of transaction from which it was derived. As an example and not by way of limitation, each user action object 302 and each resultant action object 304 may be either a create-type object, modification-type object, or deletion-type object depending on the type of transaction from which it was derived. Furthermore, each derivative object may include the unique ID 108 of the particular object in data model 100 which was affected by the transaction from which it was derived. As an example and not by way of limitation, if user transaction 202a affected object 102a in data model 100, user transaction 202a will contain unique ID 108a. In turn, when user transaction 202a is converted into user action object 302a, user action object 302a will also contain unique ID 108a, thus tying derivative object 302a to object 102a in data model 100. By including in each derivative object the unique ID 108 of the particular object in data model 100 which it affects, the derivative objects in derivative model 300 may be arranged for purposes of comparison according to the objects in data model 100 which they affect.

In particular embodiments, the actions included in a transaction log may be netted before being converted into derivative objects in a derivative model. This may reduce the size and complexity of the derivative model thus lessening the time and resources needed to compare the derivative model with another derivative model.

In particular embodiments, two derivative models may be compared with one another by comparing objects located at the same hierarchical level. As an example and not by way of limitation, first level objects (e.g., objects at the root level) may be compared with first level objects, second level objects (e.g., objects at the user action level) may be compared with second level objects, and third level objects (e.g., objects at the resultant action level) may be compared with third level objects in each derivative model. Moreover, the derivative objects located at each hierarchical level may be categorized according to their unique IDs 108 such that only derivative objects associated with the same unique ID 108 are compared with one another.

When two derivative models are compared with one another, two types of conflicts may arise: overt conflicts and concealed conflicts (discussed below). An overt conflict between two derivative objects is a conflict that is apparent without regard to any model specific rules. In particular, an overt conflict arises when two derivative objects operate on the same object in data model 100 in a mutually exclusive fashion. There are two overt conflict rules that may be used to detect overt conflicts. The first overt conflict rule states that an object in data model 100 may not be modified by one user while being deleted by another. Consequently, a delete-type derivative object and a modification-type derivative object which affect the same object in data model 100 (e.g., share the same unique ID 108) form an overt conflict. The second overt conflict rule states that a particular object property associated with an object in data model 100 may not be modified to a first value by one user while being modified to a different value by a second user. For example, two users may not concurrently rename the same object in data model 100 to different names. Consequently, two modification-type derivative objects that modify the same object property of a particular object in data model 100 form an overt conflict if each modification-type derivative object attempts to modify the same object property to a different value.

In particular situations, a user action of a first user may conflict with a resultant action of a second user. As an example and not by way of limitation, if a first user renames object 102c (a user action) in data model 100 and a second user deletes object 102a which results in the automatic deletion of object 102c (a resultant action) according to a model specific rule, an overt conflict arises between the first user's user action and the second user's resultant action. More particularly, object 102c was directly renamed by the first user, but was involuntarily deleted as a consequence of the second user's deletion of object 102a. These two actions form an overt conflict according to the overt conflict rules described above. However, since one of these conflicting actions is a user action and the other is a resultant action, their respective derivative objects will reside at different hierarchical levels in each derivative model.

To detect an overt conflict between two derivative objects at different hierarchical levels when comparing two derivative models, it may be beneficial to move or copy all derivative objects which affect the same object in data model 100 (e.g., share the same unique ID 108) to the same hierarchical level regardless of whether such derivative objects are user action objects or resultant action objects. In particular embodiments, when two derivative models are compared with one another, an initial scan may be performed on each derivative model to identify all of the derivative objects that affect the same object in data model 100 (e.g., that share the same unique ID 108). Once such a scan is performed, all derivative objects which affect the same object in data model 100 (e.g., share the same unique ID 108) may be moved to the same hierarchical level for purposes of comparison. As an example and not by way of limitation, all objects sharing the same Unique ID may be moved to the user action level for comparison. One of ordinary skill in the art will appreciate that the above-described reorganization of derivative objects between hierarchical levels was presented for the sake of explanatory simplicity and will further appreciate that the present disclosure contemplates reorganizing any suitable set or subset of derivative objects to any suitable hierarchical level for purposes of comparison.

In particular embodiments, when a particular resultant action object is moved or copied to a different hierarchical level for purposes of comparison, the relationship between the particular resultant action object and its parent object (e.g., the user action object which owns it) is maintained. As an example and not by way of limitation, if resultant action object 304c is moved or copied in order to compare derivative model 300 with another derivative model, the relationship between resultant action object 304c and user action object 302b is maintained. By maintaining the relationship between resultant action objects and their parent user action objects, the results of a conflict analysis may be described to a user in terms of the user actions that ultimately caused the conflict. As an example and not by way of limitation, if resultant action 304c conflicts with a user action object in another derivative model, the user performing the conflict analysis may be informed of the conflict in terms of either resultant action 304c or user action 302b. In particular embodiments, it may be more useful for a user to be informed of a conflict in terms of the particular user actions that ultimately caused the conflict rather than in terms of the resultant actions which caused the conflict.

Aside from comparing two derivative models to detect overt conflicts, the data in each derivative model may further be used to detect one or more concealed conflicts. A concealed conflict arises when two users perform actions which, when reconciled, violate a model-specific rule of data model 100. As an example and not by way of limitation, data model 100 may include a model-specific rule which states that only four objects may co-exist in data model 100 at any one time. Consequently, if two users each check out a copy of data model 100, wherein data model 100 contains 3 objects, and each user independently creates a fourth object, a concealed conflict will arise when the two users attempt to reconcile their changes with one another because each user is attempting to add another object to data model 100, thus violating the modeling rule that only four objects may coexist. In order to detect a concealed conflicts between two derivative models the following method may be used. First, all of the transactions described by the first derivative model may be incorporated into data model 100. Next, all of the actions described in the second derivative model may be propagated in data model 100 according to the model specific rules of data model 100. As the second set of actions is propagated through derivative model 100, any actions which violate a specific modeling rule of data model 100 are recorded. Like overt conflicts, concealed conflicts may be detected and reported in terms of either the resultant actions or user actions which caused them.

Figure 5:
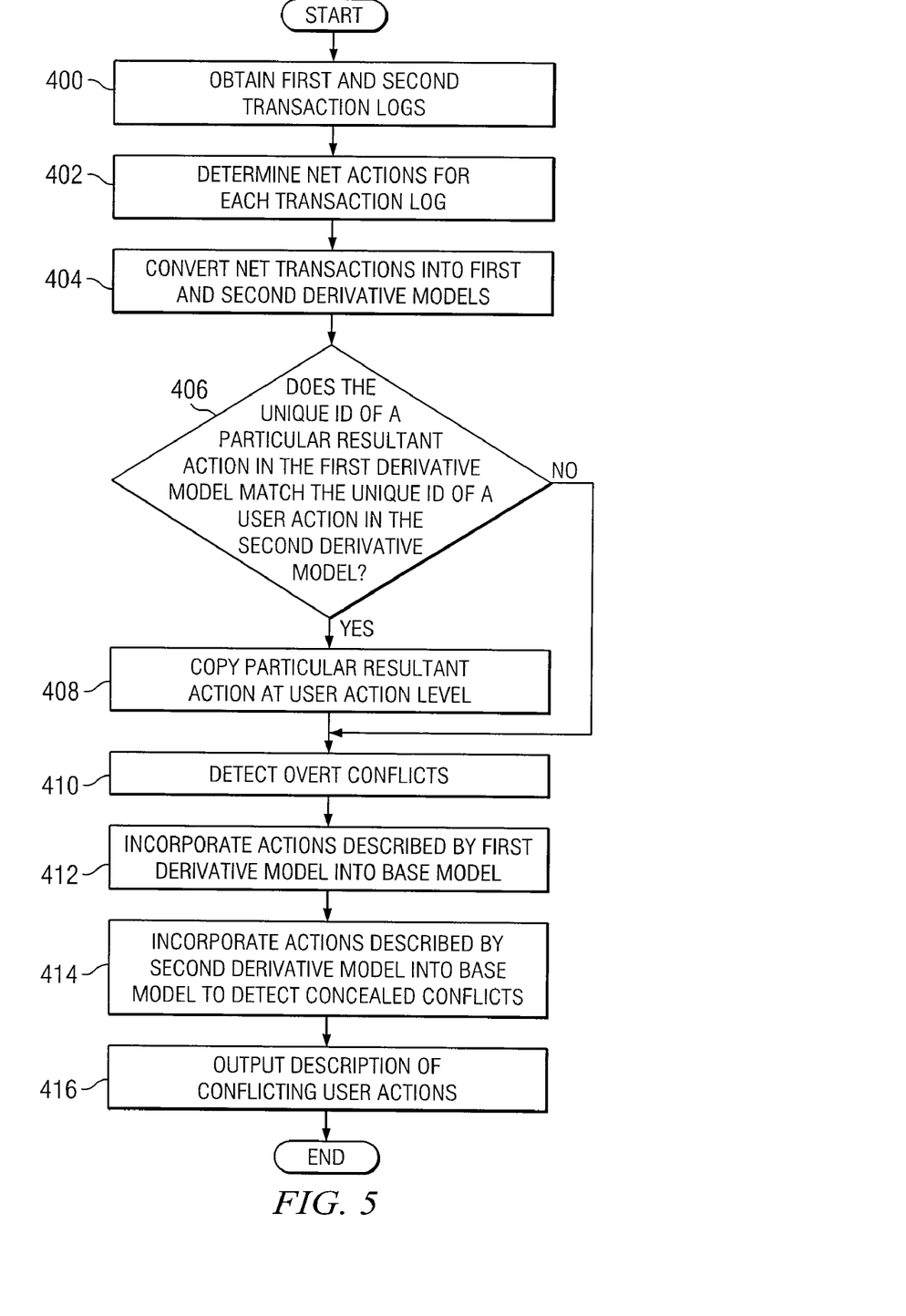
FIG. 5 illustrates an example method performing a conflict analysis according to the present disclosure.

FIG. 5 illustrates an example method by which two data models may be compared to detect conflicts. The method begins at step 400 where first and second transaction logs are obtained. The method continues at step 402 where the actions in each of the transaction logs are netted. The method continues at step 404 where each of the netted transaction logs are converted into derivative models. At step 406, it is determined whether any resultant action in the first derivative model contains a unique ID that matches the unique ID of any user action in the second derivative model and vice versa. If the unique ID of a particular resultant action in the either derivative model matches the unique ID of a user action in the other derivative model, the method continues at step 408 where a copy of the particular resultant action is made at the user action level. The method continues at step 410 where a comparison is performed between the first derivative model and the second derivative model to determine whether any overt conflicts exist. The method continues at step 412 where the actions described in the first derivative model are incorporated into data model 100. The method continues at step 414 where concealed conflicts are detected by propagating the actions described by the second derivative model in data model 100 according to the model specific rules of data model 100. The method continues at step 416 where a description of any conflicting user actions is output. After which the method ends.

The present disclosure encompasses all changes, substitutions, variations, alterations, and modifications to the example embodiments described herein that a person having ordinary skill in the art would appreciate. Moreover, none of the methodology described herein should be construed as a limitation on the order of events insofar as one of ordinary skill in the art would appreciate that such events could be altered without departing from the scope of the present disclosure. Similarly, where appropriate, the appended claims encompass all changes, substitutions, variations, alterations, and modifications to the example embodiments described herein that a person having ordinary skill in the art would comprehend.

What is claimed is:

1. A method for conflict resolution, comprising:
receiving a first transaction log including a first plurality of transactions performed by a first user on one or more objects in an original data model;
receiving a second transaction log including a second plurality of transactions performed by a second user on the one or more objects in the original data model;
converting the first plurality of transactions into a first plurality of derivative objects in a first derivative model, each of the first plurality of derivative objects comprising a respective first type indicator;

converting the second plurality of transactions into a second plurality of derivative objects in a second derivative model, each of the second plurality of derivative objects comprising a corresponding second type indicator;

comparing the first plurality of derivative objects with the second plurality of derivative objects; and determining whether one or more conflicts exist between one or more of the first plurality of derivative objects and one or more of the second plurality of derivative objects.

2. The method of claim 1, wherein:

each derivative object of the first plurality of derivative objects and each derivative object of the second plurality of derivative objects is associated with a unique identifier ("ID") identifying a particular one of the one or more objects in the original data model; and comparing the first plurality of derivative objects with the second plurality of derivative objects comprises:

comparing a unique ID associated with a first derivative object of the first plurality of derivative objects with a unique ID associated with a second derivative object of the second plurality of derivative objects, and if the unique ID associated with the first derivative object matches the unique ID associated with the second derivative object, comparing the first derivative object with the second derivative object.

3. The method of claim 1, wherein:

comparing the first plurality of derivative objects with the second plurality of derivative objects comprises comparing a type indicator of a first derivative object of the first plurality of derivative objects with a type indicator of a second derivative object of the second plurality of derivative objects; and determining whether one or more conflicts exist comprises, based on overt conflict rules, determining that an overt conflict exists if the type indicator of the first derivative object conflicts with the type indicator of the second derivative object.

4. The method of claim 3, wherein:

the type indicator is selected from the group consisting of root object, modify object, create object, and delete object; and the overt conflict exists according to the overt conflict rules if the first derivative object and the second derivative object are associated with the same unique ID; and either (1) one of the first or second derivative objects comprises a delete object while the other of the first or second derivative objects comprises a modify object, or (2) both the first and second derivative objects comprise a modify object and a modified value of the first derivative object is different from the modified value of the second derivative object wherein the modified value of both the first and second derivative objects affect a same object property.

5. The method of claim 1, wherein:

each derivative object of the first plurality of derivative objects and each derivative object of the second plurality of derivative objects is associated with a unique identifier ("ID") identifying a particular one of the one or more objects in the original data model;

the first derivative model and the second derivative model are hierarchically arranged such that derivative objects that are derived from user actions reside at a first level and derivative objects that are derived from resultant actions reside at a second level; and comparing the first plurality of derivative objects with the second plurality of derivative objects comprises:

if a unique ID of a first derivative object of the first plurality of derivative objects residing at a first level in the first derivative model matches a unique ID of a second derivative object of the second plurality of derivative objects residing at a second level of the second derivative model, creating a copy of the second derivative object and placing the copy in a first level of the second derivative model; and comparing derivative objects residing at the first level in the first derivative model with derivative objects residing at the first level in the second derivative model.

6. The method of claim 5, wherein a set of rules governs the original data model, and determining whether one or more conflicts exist comprises:

incorporating all of the first user's transaction into the original data model;

after incorporating all first user's transaction into the original data model, attempting to propagate the second user's transaction in the original data model; and determining that a concealed conflict exists if the propagation of the second user's transactions in the original data model violates the rules governing the original data model.

7. The method of claim 6, further comprising:

if it is determined that one or more overt conflicts or concealed conflicts exist, identifying as conflicting user actions each particular user action of the first user that conflicts with each particular user action of the second user, and outputting a description of the conflicting user actions.

8. The method of claim 1, further comprising netting the first plurality of transactions and the second plurality of transactions.

9. A system, comprising:

an interface operable to:

receive a first transaction log including a first plurality of transactions performed by a first user on one or more objects in an original data model;

receive a second transaction log including a second plurality of transactions performed by a second user on the one or more objects in the original data model;

a memory comprising instructions executable by one or more processors; and the one or more processors, once executing the instructions operable to:

convert the first plurality of transactions into a first plurality of derivative objects in a first derivative model, each of the first plurality of derivative objects comprising a corresponding first type indicator;

convert the second plurality of transactions into a second plurality of derivative objects in a second derivative model, each of the second plurality of derivative objects comprising a corresponding second type indicator;

compare the first plurality of derivative objects with the second plurality of derivative objects; and determine whether one or more conflicts exist between one or more of the first plurality of derivative objects and one or more of the second plurality of derivative objects.

10. The system of claim 9, wherein:

each derivative object of the first plurality of derivative objects and each derivative object of the second plurality of derivative objects is associated with a unique identifier ("ID") identifying a particular one of the one or more objects in the original data model; and the one or more processors are operable to compare the first plurality of derivative objects with the second plurality of derivative objects by:

comparing a unique ID associated with a first derivative object of the first plurality of derivative objects with a unique ID associated with a second derivative object of the second plurality of derivative objects, and if the unique ID associated with the first derivative object matches the unique ID associated with the second derivative object, comparing the first derivative object with the second derivative object.

11. The system of claim 9, wherein the one or more processors are operable to:
compare the first plurality of derivative objects with the second plurality of derivative objects by comparing a type indicator of a first derivative object of the first plurality of derivative objects with a type indicator of a second derivative object of the second plurality of derivative objects; and
determine whether one or more conflicts exist by, based on overt conflict rules, determining that an overt conflict exists if the type indicator of the first derivative object conflicts with the type indicator of the second derivative object.

12. The system of claim 11, wherein:
the type indicator is selected from the group consisting of root object, modify object, create object, and delete object; and
the overt conflict exists according to the overt conflict rules if the first derivative object and the second derivative object are associated with the same unique ID; and either (1) one of the first or second derivative objects comprises a delete object while the other of the first or second derivative objects comprises a modify object, or (2) both the first and second derivative objects comprise a modify object and a modified value of the first derivative object is different from the modified value of the second derivative object wherein the modified value of both the first and second derivative objects affect a same object property.

13. The system of claim 9, wherein:
each derivative object of the first plurality of derivative objects and each derivative object of the second plurality of derivative objects is associated with a unique identifier ("ID") identifying a particular one of the one or more objects in the original data model;
the first derivative model and the second derivative model are hierarchically arranged such that derivative objects that are derived from user actions reside at a first level and derivative objects that are derived from resultant actions reside at a second level;
the one or more processors are operable to compare the first plurality of derivative objects with the second plurality of derivative objects by:
if a unique ID of a first derivative object of the first plurality of derivative objects residing at a first level in the first derivative model matches a unique ID of a second derivative object of the second plurality of derivative objects residing at a second level of the second derivative model, creating a copy of the second derivative object and placing the copy in a first level of the second derivative model; and
comparing derivative objects residing at the first level in the first derivative model with derivative objects residing at the first level in the second derivative model.

14. The system of claim 13, wherein a set of rules governs the original data model and the one or more processors are operable to determine whether one or more conflicts exist by:
incorporating all of the first user's transaction into the original data model;
after incorporating all first user's transaction into the original data model, attempting to propagate the second user's transaction in the original data model; and
determining that a concealed conflict exists if the propagation of the second user's transactions in the original data model violates the rules governing the original data model.

15. The system of claim 14, wherein one or more processors are further operable to:
if it is determined that one or more overt conflicts or concealed conflicts exist, identify as conflicting user actions each particular user action of the first user that conflicts with each particular user action of the second user, and output a description of the conflicting user actions.

16. The system of claim 9, wherein one or more processors are further operable to net the first plurality of transactions and the second plurality of transactions.

17. Logic encoded in a tangible computer readable media, the logic operable when executed by a processor to:
receive a first transaction log including a first plurality of transactions performed by a first user on one or more objects in an original data model;
receive a second transaction log including a second plurality of transactions performed by a second user on the one or more objects in the original data model;
convert the first plurality of transactions into a first plurality of derivative objects in a first derivative model, each of the first plurality of derivative objects comprising a corresponding first type indicator;
convert the second plurality of transactions into a second plurality of derivative objects in a second derivative model, each of the second plurality of derivative objects comprising a corresponding second type indicator;
compare the first plurality of derivative objects with the second plurality of derivative objects; and
determine whether one or more conflicts exist between one or more of the first plurality of derivative objects and one or more of the second plurality of derivative objects.

18. The logic of claim 17, wherein:
each derivative object of the first plurality of derivative objects and each derivative object of the second plurality of derivative objects is associated with a unique identifier ("ID") identifying a particular one of the one or more objects in the original data model; and
the logic is operable to compare the plurality of derivative objects in the first derivative model with the plurality of derivative objects in the second derivative model by:
comparing a unique ID associated with a first derivative object of the first plurality of derivative objects with a unique ID associated with a second derivative object of the second plurality of derivative objects, and if the unique ID associated with the first derivative object matches the unique ID associated with the second derivative object, comparing the first derivative object with the second derivative object.

19. The logic of claim 18, wherein:
each derivative object of the first plurality of derivative objects and each derivative object of the second plurality of derivative objects is associated with a unique identifier ("ID") identifying a particular one of the one or more objects in the original data model;
the first derivative model and the second derivative model are hierarchically arranged such that derivative objects that are derived from user actions reside at a first level and derivative objects that are derived from resultant actions reside at a second level; and the logic is operable to compare the first plurality of derivative objects with the second plurality of derivative objects by:

if a unique ID of a first derivative object of the first plurality of derivative objects residing at a first level in the first derivative model matches a unique ID of a second derivative object of the second plurality of derivative objects residing at a second level of the second derivative model, creating a copy of the second derivative object and placing the copy in a first level of the second derivative model; and comparing derivative objects residing at the first level in the first derivative model with derivative objects residing at the first level in the second derivative model.

20. The logic of claim 19 wherein:

a set of rules governs the original data model and the logic is operable to determine whether one or more conflicts exist by:

incorporating all of the first user's transaction into the original data model;

after incorporating all first user's transaction into the original data model, attempting to propagate the second user's transaction in the original data model; and determining that a concealed conflict exists if the propagation of the second user's transactions in the original data model violates the rules governing the original data model.

* * * * *